United States Patent [19]

Fukuda et al.

[11] Patent Number: 5,228,179
[45] Date of Patent: Jul. 20, 1993

[54] BELLOWS TUBE INSTALLATION DEVICE

[75] Inventors: Michio Fukuda; Yoshinobu Ota; Hiroshi Kagei, all of Mie, Japan

[73] Assignee: Sumitomo Wiring Systems, Ltd., Mie, Japan

[21] Appl. No.: 939,668

[22] Filed: Sep. 3, 1992

[30] Foreign Application Priority Data

Sep. 4, 1991 [JP] Japan .................. 3-253166

[51] Int. Cl.$^5$ ............................................. B23P 19/04
[52] U.S. Cl. ................................................... 29/241
[58] Field of Search ............ 29/241, 433, 728, 819, 29/235, 234; 254/139.3 FT

[56] References Cited

U.S. PATENT DOCUMENTS 3,874,061 4/1975 Gauthier ............................. 29/241
5,058,259 10/1991 Araki et al. ......................... 29/241

Primary Examiner—Robert C. Watson
Attorney, Agent, or Firm—Sughrue, Mion, Zinn, Macpeak & Seas

[57] ABSTRACT

A bellows tube installation device comprises a first clamp mechanism 4 for holding a bellows tube T placed over a tube guide 1. The first clamp mechanism 4 is displaced toward the distal end portion of the tube guide 1 along tube guide, so that a slit of the bellows tube having reached the distal end of the tube guide 1 is enlarged. An electric wire W is inserted into the bellows tube T at the distal end portion thereof through such an enlarged slit. The bellows tube T, having the electric wire W inserted therein at the distal end portion thereof, is clampedly held by a second clamp mechanism 6. The second clamp mechanism 6 is displaced along the electric wire W toward the distal end of the electric wire by a second displacement mechanism 7, whereby the bellows tube T is entirely fitted over the electric wire W.

3 Claims, 10 Drawing Sheets

BELLOWS TUBE INSTALLATION DEVICE

BACKGROUND OF THE INVENTION

1. Field of the Invention

This invention relates to a bellows tube installation device for fitting a length of bellows tube over a filamentous body, such as electric wire or the like.

2. Statement of the Prior Art

For convenience of illustration, a conventional method for fitting or installing electric wire into a bellows tube will be explained with reference to the attached drawings. FIG. 15 is a sectional view of a bellows tube into which a length of electric wire is inserted.

In a electric wiring system for automobiles, for example, an electric wire W is sometimes received within a bellows tube T, as shown in FIG. 15, in order to protect the electric wire having connected thereto connectors at each end thereof so as to maintain flexibility of the wire. The electric wire W often constitutes a portion of a wiring harness to which connectors C are connected at each end thereof, so that it is usually impossible to install the bellows tube T onto the electric wire W from one end thereof. Accordingly, installation of the bellows tube T onto such an electric wire W is conventionally performed by manually enlarging a slit D formed longitudinally in the bellows tube so as to insert the electric wire W into the bellows tube T through such an enlarged slit.

In such a conventional method, it requires a substantial force to manually enlarge the slit, since the bellows tube T is not easily deformed upon application of a force in a radial direction, due to protrusions and recesses of the bellows tube serving as ribs to strengthen the bellows tube. Thus, it is very tiresome and not efficient to insert an electric wire W into a bellows tube T through a slit D while manually enlarging the slit.

SUMMARY OF THE INVENTION

A principle object of the invention is to provide a bellows tube installation device which permits easy installation of a bellows tube onto an electric wire, without the need of manual operation to enlarge a slit in the bellows tube.

Another object of the invention is to provide a bellows tube installation device which permits automatic installation of a bellows tube having a longitudinally extending slit onto a filamentous or elongated body.

In order to achieve the above object, the present invention provides a bellows tube installation device comprising: a tube guide insertable into a bellows tube of a predetermined length, the bellows tube being formed with a slit extending longitudinally of the bellows tube, the tube guide having a distal end which is configured to enlarge the slit of the bellows tube placed over the tube guide, so that a filamentous body to be received within the bellows tube may pass through the enlarged slit; means for setting the filamentous body at a position in which the filamentous body is adjacent the distal end of the tube guide, or a position in which the filamentous body intersects the distal end of the tube guide; a first clamp means for clampedly holding the bellows tube which is placed over the tube guide, the first clamp means being movable, together with the bellows tube clampedly held by the first clamp means, toward the distal end of the tube guide; a first displacement means for moving the first clamp means along the tube guide to a position in which one end portion of the filamentous body is partly inserted at least into the distal end portion of the bellows tube through the slit; a second clamp means for holding the bellows tube, at least the distal end portion of the bellows tube partly receiving the one end portion of filamentous body, at a position where the filamentous body is inserted into the bellows tube, the second clamp means being movable, together with the bellows tube clamped by the second clamp means, along the longitudinal axis of the filamentous body toward the other end of the filamentous body; and a second displacement means for moving the second clamp means.

The bellows tube installation device of the invention may further comprise a presser means for pressing the bellows tube moving, together with the second clamp means, toward the other end of the filamentous body at a position adjacent to the distal end portion of the tube guide and opposite to the side in which the slit is formed.

The tube guide of the bellows tube installation device of the invention may include a guide protrusion extending longitudinally of the tube guide and protruding outwardly from the slit of the bellows tube placed over the tube guide.

According to the bellows tube installation device of the invention, a bellows tube having been placed over a tube guide from the proximal end thereof is clampedly held by a first clamp means. The first clamp means holding the bellows tube is moved by a first displacement means so as to cause the bellows tube to be slid along the tube guide. When the distal end or tip of the bellows tube reaches the distal end or tip of the tube guide, the distal end of the bellows is enlarged, i.e., opening of a slit in the distal end portion of the bellows tube is widened or increased. Further movement of the tube guide, together with the first clamp means, causes a filamentous body located or positioned adjacent the distal end of the tube guide to be received within the distal end of the bellows tube. The bellows tube through the enlarged slit of the bellows tube. The bellows tube having a filamentous body inserted within the distal end portion thereof is held by a second clamp means. The second clamp means holding the bellows tube is actuated by a second displacement means, so that it is moved toward the other end of the filamentous body along the filamentous body. During this movement, the filamentous body is gradually inserted into the bellows tube through the slit of the bellows tube.

It is possible to provide a presser means which serves to restrict the bellows tube, moving from the distal end of the tube guide to a fixed part of the filamentous body, from moving away from the filamentous body.

It is also possible to provide the tube guide with a guide protrusion which engages within the slit of the bellows tube placed over the tube guide so as to guide the bellows tube along the slit, thereby preventing the bellows tube from twisting.

BRIEF DESCRIPTION OF THE DRAWINGS

For a better understanding of the invention, and to show how the same may be carried out, reference will now be made, by way of example, to the accompanying drawings in which like reference numerals refer to like elements.

DETAILED DESCRIPTION OF THE PREFERRED EMBODIMENTS

Several embodiments of the bellows tube installation device according to the invention will be explained below with reference to FIGS. 1 to 14.

Figure 1:
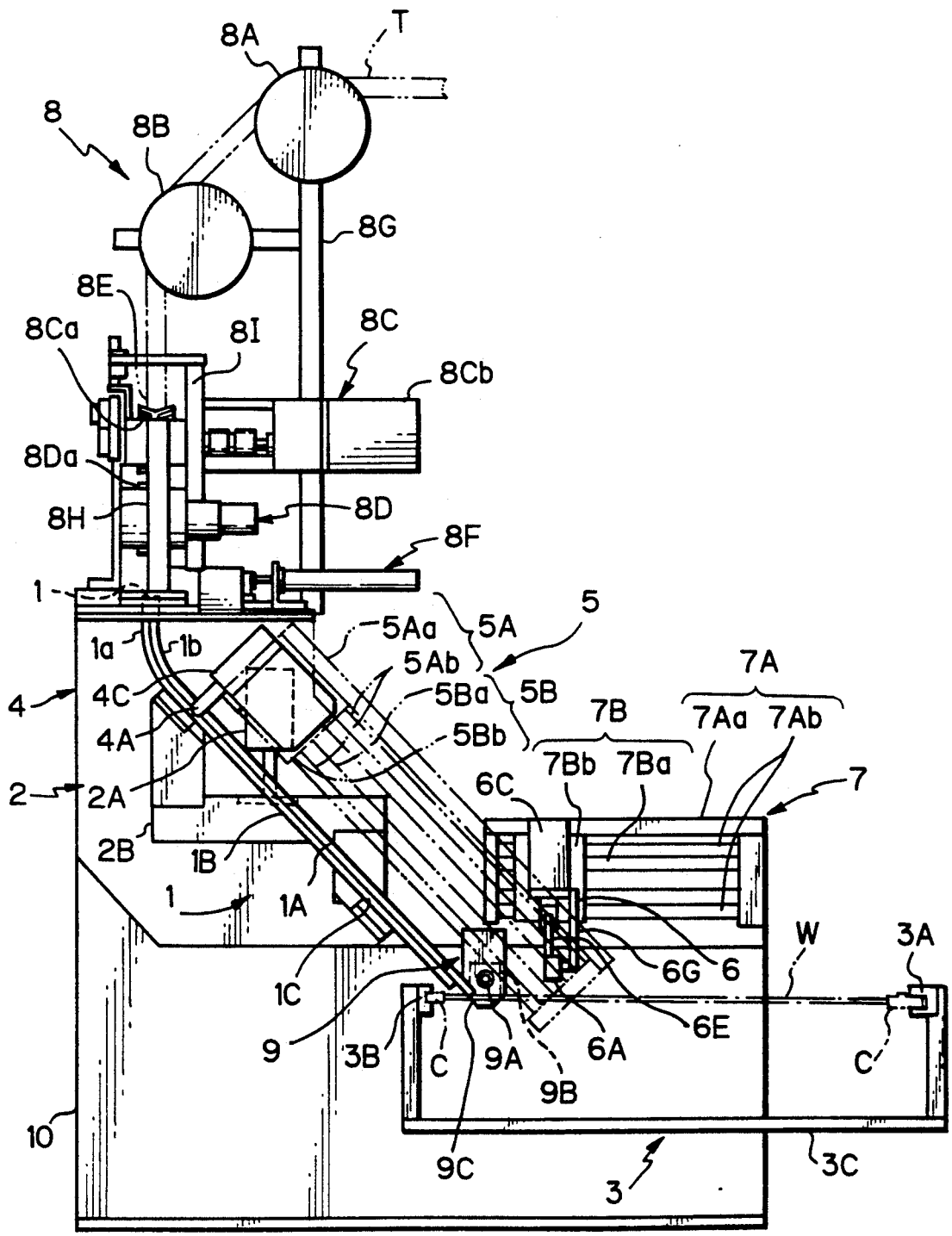
FIG. 1 is a schematic front elevational view illustrating a bellows tube installation device according to the invention.
Figure 15:
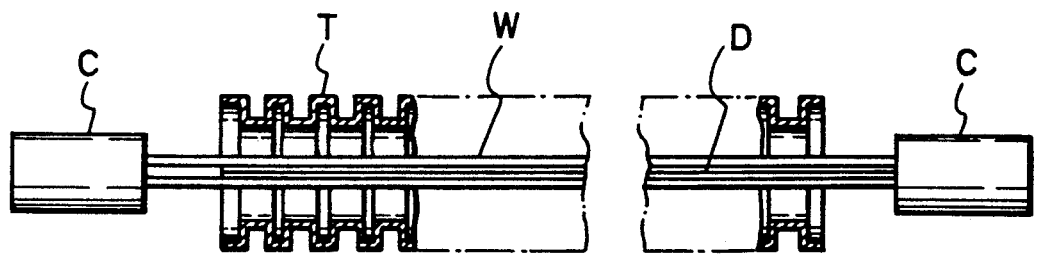
FIG. 15 is a sectional view illustrating electric wire over which the bellows tube is fitted.

A bellows tube installation device according to one embodiment of the invention as shown in FIG. 1 is adapted to fit a bellows tube T, having a slit D therein as explained above with reference to FIG. 15, over a length of electric wire W of a wiring harness. The illustrated bellows tube installation device comprises a tube guide 1, a guide displacement means 2, a harness positioning part 3, a first clamp means 4, a first displacement means 5, a second clamp means 6, a second displacement means 7, means for supplying bellows tubes 8, and a presser means 9. The tube guide 1 through presser means 9 are all mounted on a base 10.

Figure 2:
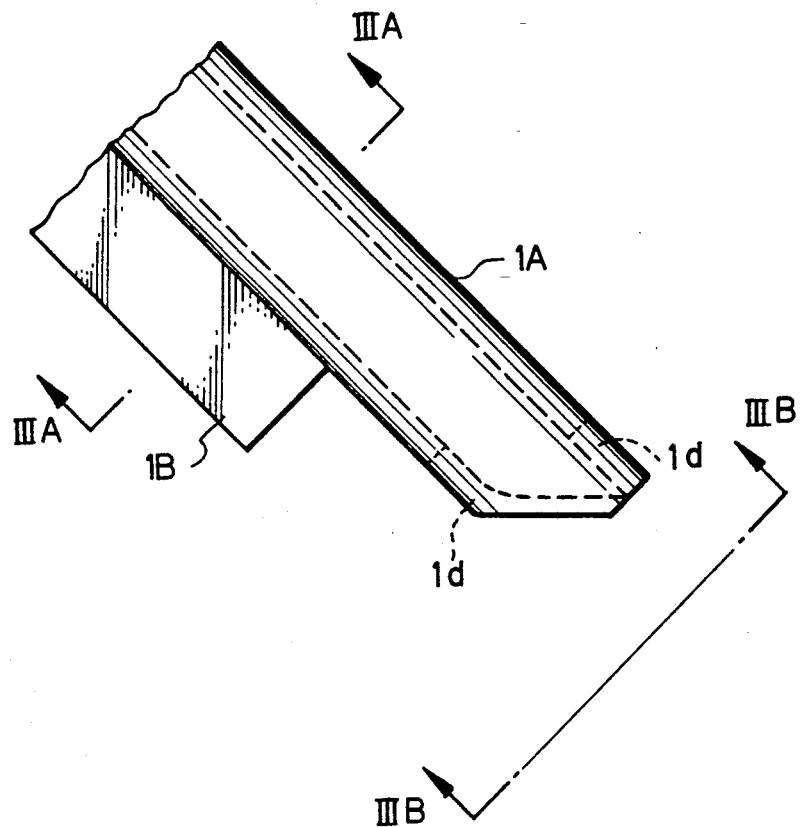
FIG. 2 is an enlarged front elevational view of a tube guide.

As shown more clearly in FIGS. 2 and 3, the tube guide 1 includes a pipe 1A constituting a guide body, and a guide protrusion 1B integrally provided in the periphery of the pipe 1A and extending longitudinally of the pipe 1A. As shown in FIG. 1, the proximal portion 1a of the tube guide 1 defines an angle of 135 degrees with respect to a straight portion 1c disposed distally of a gently curved portion or bend 1b and connected to the proximal portion 1a via the curved portion or bend. The guide tube 1 is maintained by the guide displacement means 2, which will be explained later, in a position in which the proximal portion 1a thereof is oriented in a vertical direction, while the straight portion 1c is inclined 45 degrees with respect to the vertical direction.

Figure 3A:
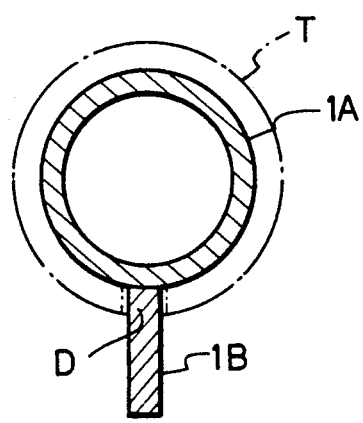
FIG. 3A and 3B are views illustrating a configuration of the tube guide.
Figure 3B:
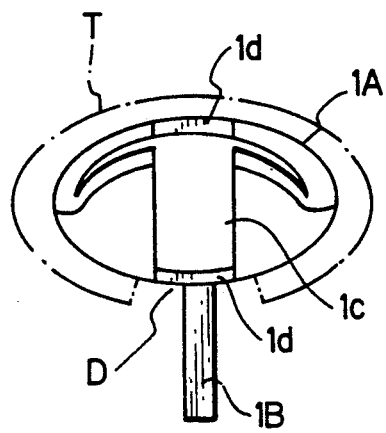

FIG. 3a is a sectional view along line IIIA—IIIA in FIG. 2, and FIG. 3B is a view as seen from line IIIB—IIIB in FIG. 2. As shown in FIG. 3B, the distal end of the pipe 1A is formed into a flattened configuration having a lateral dimension greater than that of the remaining portion. Accordingly, and when the bellows tube T is fitted over the distal portion of the pipe 1A, slit portion D in the bellows tube T around the distal portion of the pipe 1A will be enlarged with respect to slit portion D in the bellows around the portion of the pipe other than the distal portion.

The distal portion of the pipe 1A is configured so as to make the slit D in the bellows tube fitted over the distal portion of the pipe define an opening through which the electric wire W may be inserted into the bellows tube T. The pipe 1A is formed at its distal portion with a notch 1d disposed centrally along the transverse direction as seen in FIG. 3B. The notch 1d accommodates electric wire W in the harness secured to the harness positioning part 3.

The guide displacement means 2 includes an air cylinder 2A secured to the base 10, and a guide support member 2B connected to a piston rod of the air cylinder 2A. The piston rod of the air cylinder 2A is reciprocal in a vertical direction. The guide support member 2B is secured to the guide protrusion 1B of the tube guide 1 at two, vertically spaced apart locations. Thus, the guide displacement means 2 is able to move the tube guide 1 in the vertical direction by means of actuation of the air cylinder 2A. The guide displacement means 2 moves the tube guide 1 between a position shown in FIG. 10 in which the proximal portion of the tube guide 1 is disposed adjacent to a lower end of a tube guide 8E, to be explained later, in the bellows tube supply means 8, and a position shown in FIG. 11 in which the distal end of the tube guide 1 and electric wire W are crossed with each other. In this regard, it is noted that, in the illustrated position in which the distal end of the tube guide 1 and the electric wire are crossed with each other, the electric wire W is received in the notch 1d formed in the distal end of the tube guide 1.

The harness positioning part 3 is, as known in the art, disposed so as to fix the harness at a position, whereby the electric wire W may be inserted into the notch 1d formed in the distal end of the tube guide 1 in its lower limit position. The harness positioning part 3 of this embodiment is designed to secure connectors C connected to each end of the electric wire W to connector securement parts 3A, 3B, so as to set the electric wire W at a predetermined position.

The connector securement parts 3A, 3B are mounted on a frame 3C secured to the base 10 at each end thereof. The connector securement parts 3A, 3B may be constituted, for example, by connectors associated with the respective connectors and fixed to the frame 3C. In this regard, it should be noted that the connector securement parts 3A, 3B may have any suitable construction which permits the connectors C to be fixed so as to position the electric wire W at a predetermined position. For example, the connector C may be clamped between a pair of clamp members and secured by means of a screw.

Figure 4:
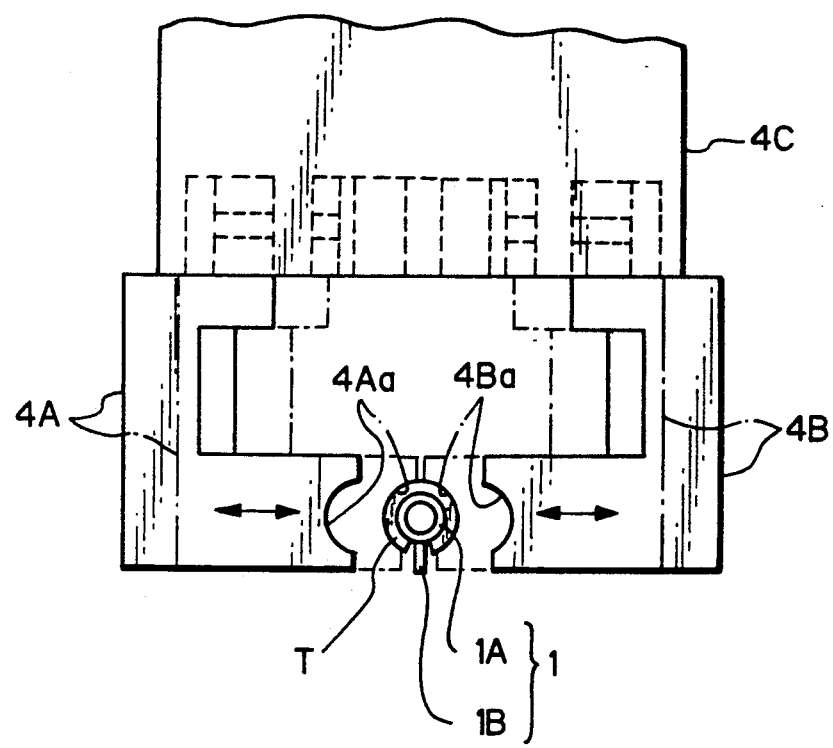
FIG. 4 is an enlarged view illustrating a first clamp means.

The first clamp means 4 is provided so as to clampedly hold the bellows tube T which is fitted over the tube guide 1 at a position slightly distal of the curved portion 1b of the tube guide 1. The first clamp means includes, as shown in FIG. 4, clamp members 4A, 4B being displaceable radially of the tube guide 1 and shaped symmetrically with each other, and a drive part 4C for driving the clamp members 4A, 4B.

The clamp members 4A, 4B are designed to clamp the bellows tube T between recesses 4Aa, 4Ba formed in their respective confronting end surfaces, when the clamp members get close relative one another. The drive part 4C displaces the clamp members 4A, 4B in a direction of approaching relative one another or apart from one another. The drive part 4C includes two pistons disposed in a cylinder block. The pistons are moved simultaneously in opposite directions when the cylinder block is supplied with air. The clamp members 4A, 4B are moved in association with the piston. The thus constructed first clamp means 4 may be displaced along the tube guide 1 by the actuation of the first displacement means 5.

The first displacement means 5 includes a guide member 5A secured to the base 10, and a rodless cylinder 5B mounted on the guide member 5A and serving as a driving source. The guide member 5A includes a frame 5A$a$ having a "mirror image of C" configuration and located at a position distal of the curved portion 1$b$ of the tube guide 1 and confronting relationship therewith, and two guide rods 5A$b$ disposed between the opposite ends of the frame 5A$a$ in parallel relationship with the axis of the tube guide 1 confronting to the guide rods.

The rodless cylinder 5B includes an air cylinder body 5B$a$ disposed between the two guide rods 5A$b$ and fixed to the opposite ends of the frame 5A$a$, and a movable block 5B$b$ to be moved in accordance with movement of a piston (not shown) displaceable within the air cylinder body 5B$a$. The movable block 5B$b$ and the piston in the air cylinder body 5B$a$ are combined together by means of magnetic attraction force exerted by their respective magnets. The drive part 4C of the first clamp means 4 is fixed to the movable block 5B$b$.

The second clamp means 6 is disposed at a position above the electric wire W positioned at the harness positioning part 3 and adjacent to the distal end of the tube guide 1. The second clamp means 6, as shown in FIG. 5, includes a pair of clamp members 6A, 6B, and an air cylinder 6C acting as a driving source. The rotational shaft 6$a$ is journaled by an attachment member 6G, and the air cylinder 6C is secured to the attachment member 6G. A connection member 6D is secured to the piston rod of the air cylinder 6C, and the clamp members 6A, 6B are connected to links 6E, 6F, respectively, by means of the connection member 6D.

Figure 5A:
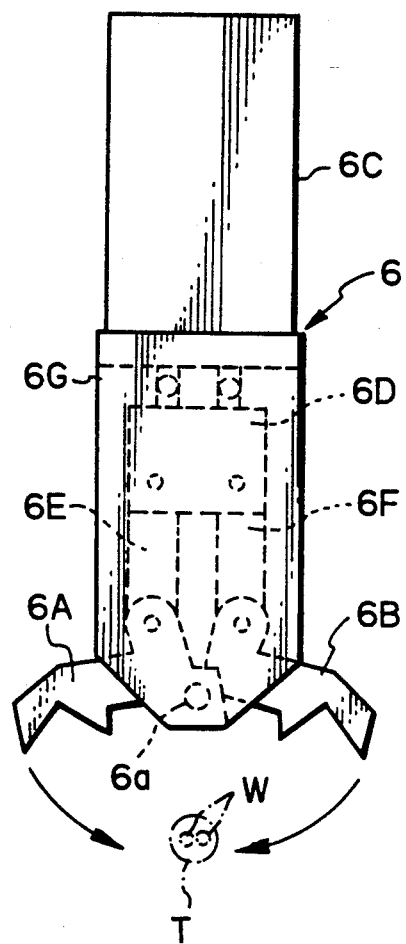
FIG. 5A and 5B are enlarged views illustrating a second clamp means.
Figure 5B:
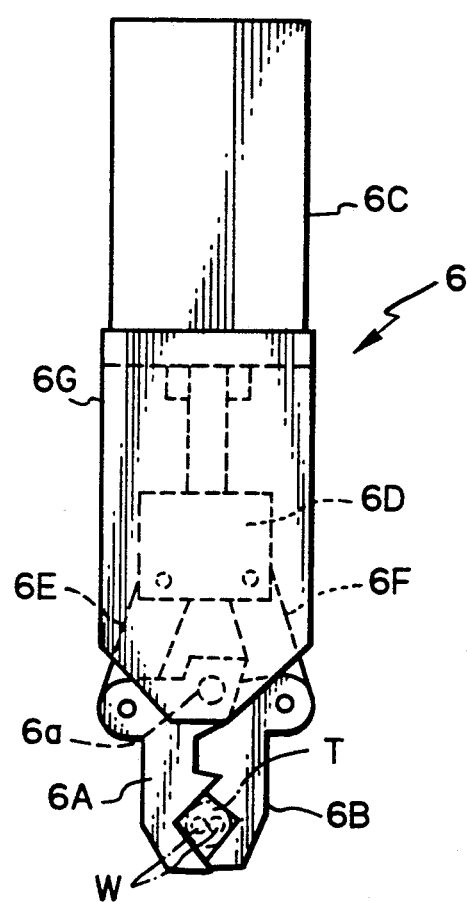

The second clamp means 6 actuates the air cylinder 6C so as to displace the connection member 6D in vertical direction, whereby the clamp members 6A, 6B are rotated about the rotational shaft 6$a$. Specifically, and as shown in FIG. 5A, the clamp member 6A, 6B are opened, when the piston rod of the air cylinder 6C is retracted so as to locate the connection member 6D at an upward position. When the poston rod is extended from the above position, the clamp members 6A, 6B are rotated about the rotational shaft 6$a$ in the direction of arrow marks in FIG. 5A. As illustrated in FIG. 5B, the clamp members 6A, 6B cooperate to clamp therebetween the bellows tube T which receives therein the electric wire W positioned at the harness positioning part 3. The second clamp means 6 may be displaced along the electric wire upon actuation of the second displacement means.

The second displacement means is constructed in substantially the same manner as the first displacement means 5. Specifically, the second displacement means 7 includes a guide member 7A secured to the base 10, and a rodless cylinder 7B mounted on the guide member 7A for serving as a driving source. The guide member 7A includes a frame 7A$a$ having a "mirror image of U" shaped configuration and disposed at a position opposite to one end of the electric wire W, and two guide rods 7A$b$ disposed between the opposite ends of the electric wire W in parallel relationship with the longitudinal axis of the electric wire W opposed to the guide rods. The rodless cylinder 7B includes an air cylinder body 7B$a$ disposed between the two guide rods 7A$b$ and connected to the opposite ends of the frame 7A$a$, and a displaceable or movable block 7B$b$ to be moved in accordance with the movement of a piston (not shown) moving within the air cylinder body 7B$a$. The movable block 7B$b$ and the piston in the air cylinder body 7B$a$ are combined together by means of magnetic attraction force exerted by their respective magnets. The air cylinder 6C of the second clamp means 6 is secured to the movable block 7B$b$.

Figure 6:
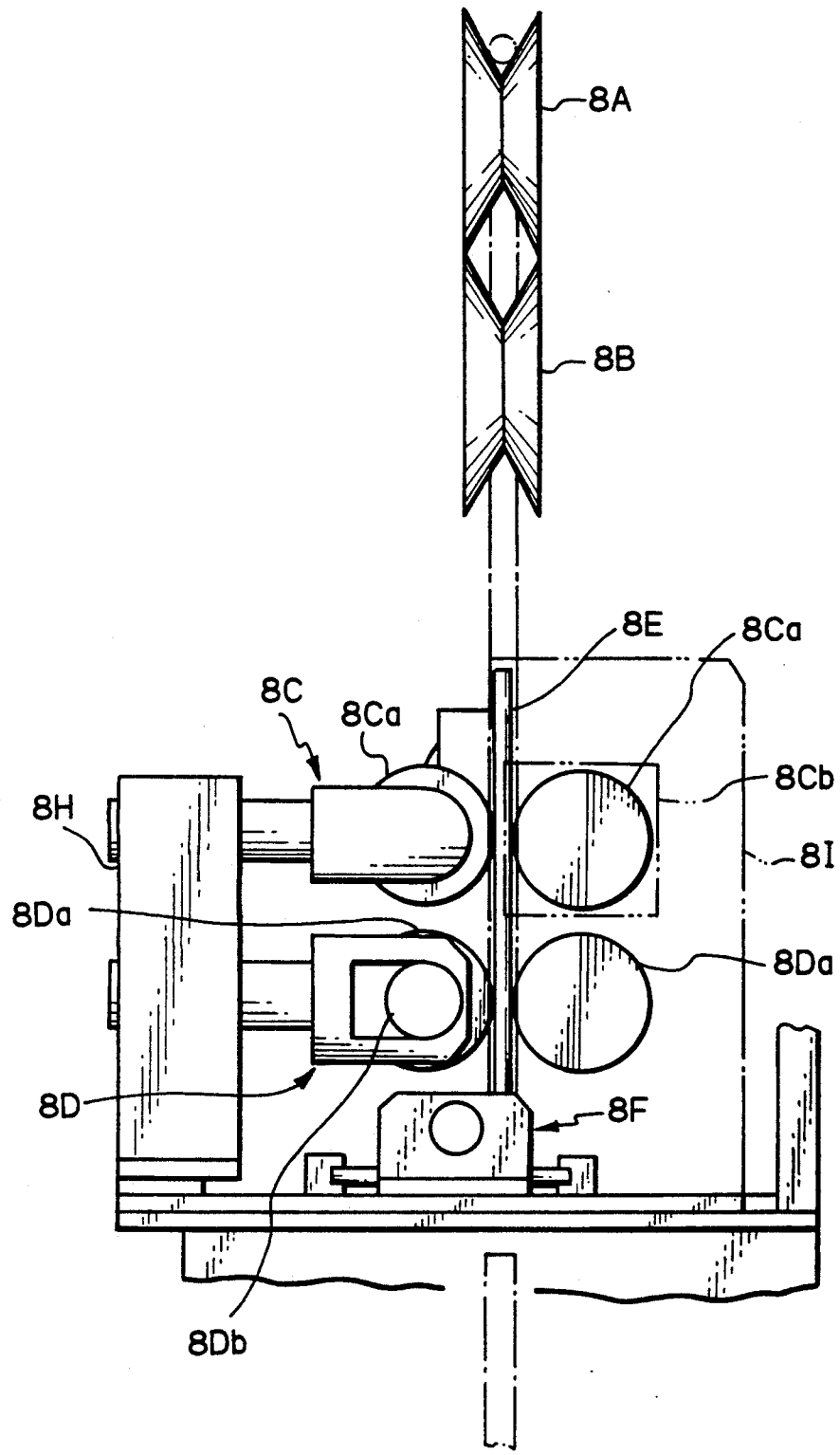
FIG. 6 is a fragmentary side elevational view of a bellows tube supply means.

The means for supplying bellows tubes 8 is provided so as to supply bellows tubes 8 cut into a predetermined length to the guide rod 1. As also shown in FIG. 6, the bellows tube supplying means 8 includes guide pulleys 8A, 8B, feed means 8C, length measurement means 8D, a tube guide 8E, and cutting means 8F.

The guide pulleys 8A, 8B are rotatably supported by a frame 8G protruding upwardly from the base 10. The guide pulleys 8A, 8B supply a bellows tube T drawn from bellows tubes supply source (not shown) to the feed means 8C.

Figure 7:
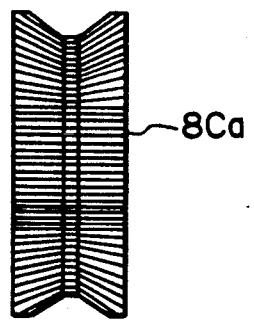
FIG. 7 is a view showing a feed roller.
Figure 8:
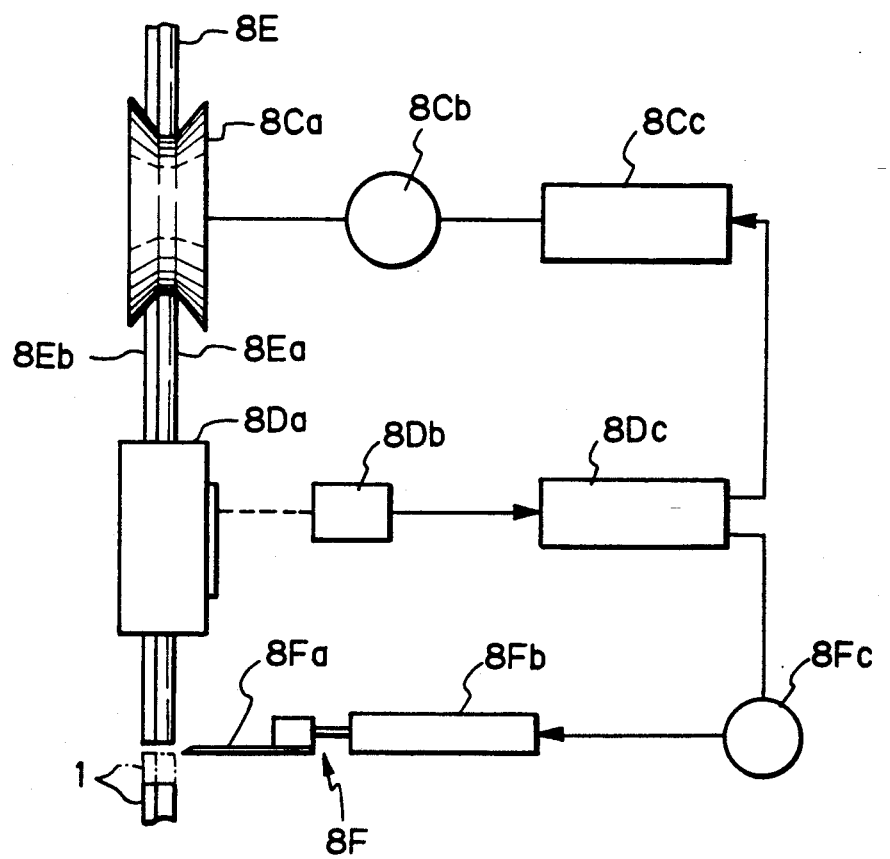
FIG. 8 is an illustration showing construction of the bellows tube supply means.

The feed mans 8C includes a pair of rollers 8C$a$, 8C$a$ journaled by a support frame 8H upstanding form the base 10 or a support frame 8I and being rotatable with the bellows tube T clamped between the respective outer circumferential surfaces of the rollers, and a feed motor 8C$b$ mounted on the support frame 8I with a drive shaft thereof connected to one of the feed rollers 8C$a$. As shown in FIG. 8, actuation of the feed motor 8$cb$ is controlled by a control signal sent from a drive circuit 8C$c$. The feed rollers 8C$a$, 8C$a$ each include a circumferential configuration having a V-shaped groove, as also shown in FIG. 7. Each outer circumferential surface of V-shaped groove configuration is formed with teeth for engagement with the outer periphery of the bellows tube T.

The length measurement means 8D includes a pair of rubber rollers 8D$a$, 8D$a$ journaled by the frame 8H or 8I for clampedly supporting the bellows tube T supplied from the feed means 8C at a position downstream of the feed means 8C. The rubber rollers 8D$a$, 8D$a$ are rotated an amount corresponding to the displacement of the bellows tube clamped therebetween upon movement of the bellows tube T.

The length measurement means 8D also includes a rotary encoder (not shown) mounted on a rotating shaft of one of the rubber rollers 8D$a$ for unitary rotation with the rubber roller 8D$a$, and a photoelectric switch 8D$b$ attached to the support frame 8H for measuring number of rotations of the rotary encoder. As shown in FIG. 8, an output from the photoelectric switch 8D$b$ is signaled to a control unit 8D$c$.

The control unit 8D$c$ outputs a drive signal to an air supply 8F$c$ of an air cylinder 8F$b$ which will be explained later, when the number of rotations detected by the photoelectric switch 8D$b$ reaches a predetermined value.

Figure 9:
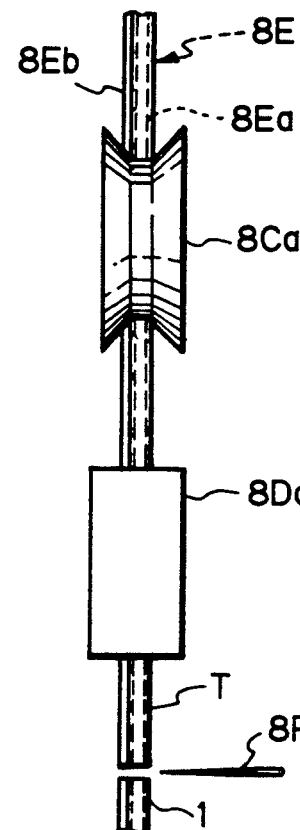
FIG. 9 is an illustrative view showing one stage of installation of the bellows tube.
Figure 10:
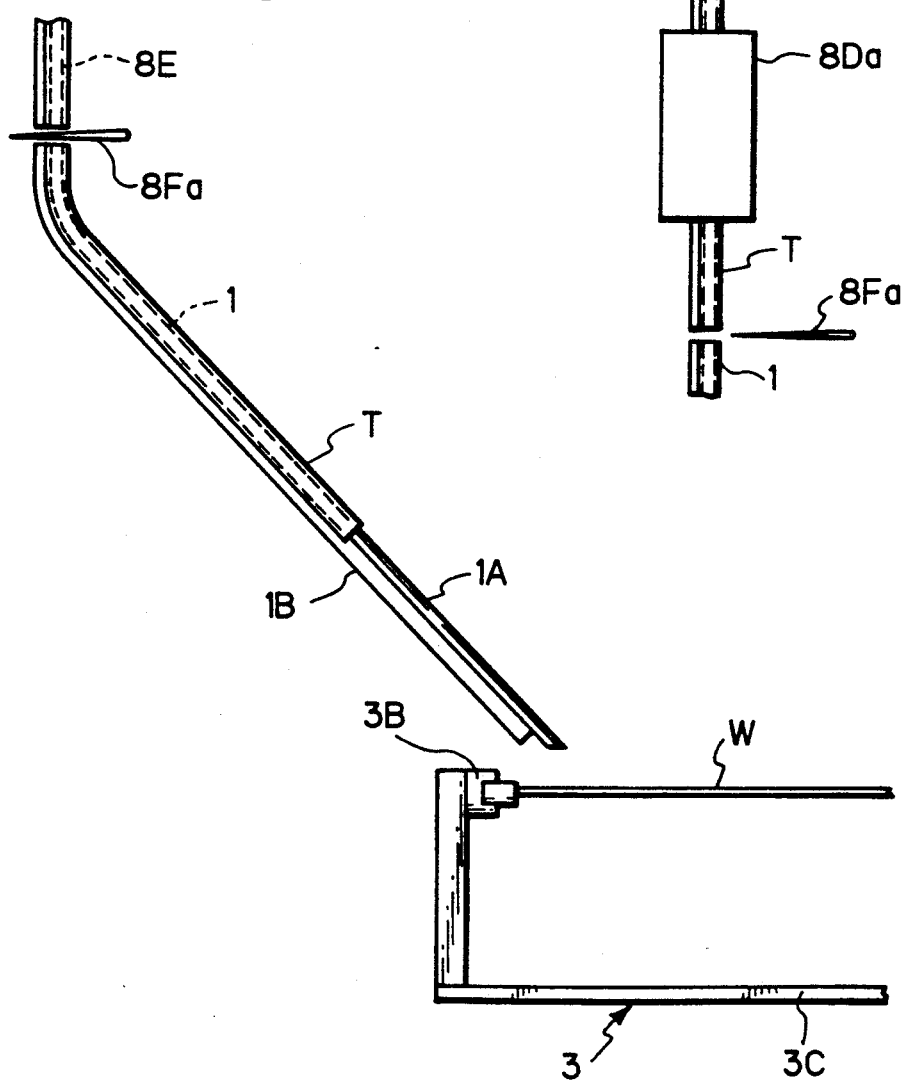
FIG. 10 is an illustrative view showing another stage of installation of the bellows tube.

A tube guide 8E is disposed and oriented vertically so that it may pass through between the feed rollers 8C$a$, 8C$a$ and also between the rubber rollers 8D$a$, 8D$a$. The tube guide 8E has a configuration similar to that of the above guide tube 1 and includes, as shown in FIGS. 8 and 9, a pipe 8E$a$ of a diameter the same as that of the pipe 1A, and a guide protrusion 8E*b* having configuration the same as that of the guide protrusion 1B. The guide tube 8E is fixed to the support frame 8I with the lower end thereof disposed at a position above a path of a cutter 8F*a* of a cutter means 8F which will be explained later and adjacent to the path. The proximal portion of the tube guide 1 and the tube guide 8E are disposed on a common axis.

The cutter means 8F includes the above-mentioned cutter 8F*a* (see FIG. 8) movable in a horizontal direction, and an air cylinder 8F*b* for driving the cutter 8F*a* (cutter 8F*a* is not shown in FIG. 1). As explained above, the air cylinder 8F*b* is actuated when a drive signal is supplied from the control unit 8D*c* to the air supply 8F*c*, so as to move the cutter 8F*a* in a direction transverse to the portion at which the proximal end of the tube guide 1 and the tube guide 8E are opposed with each other, and then returning the cutter to its original position.

The presser means 9 includes a presser rod 9A and an air cylinder 9B for driving the presser rod 9A. The air cylinder 9B is secured to the base 10 by means of an attachment plate 9C. The presser rod 9A is secured to a piston rod of the air cylinder 9B. The presser rod 9A is positioned above the electric wire W located at a predetermined position by means of the harness positioning part 3 when the piston rod of the air cylinder 9B is extended, so that it limits upward movement of the bellows tube T fitted over the electric wire W. When the piston rod of the air cylinder 9A is withdrawn or retracted, the presser rod 9A is moved transversely or laterally from the position above the electric wire W.

The bellows tube installation device constructed in accordance with the above serves to fit the bellows tube T over the electric wire W in a manner illustrated in FIGS. 9 to 13.

Prior to actuating the bellows tube installation device, the bellows tube T introduced by means of the guide pulleys 8A, 8B is fitted over the tube guide 8E of the bellows tube installation device 8. The bellows tube T is moved in a path between the rollers 8C*a*, 8C*a* and rubber rollers 8D*a*, 8D*a*, so that the distal end of the bellows tube is positioned opposite to the blade edge of the cutter 8F*a*. As shown by dotted line in FIG. 1, the connectors C at each end of the harness are secured to the connector securement parts 3A, 3B, respectively, of the harness positioning part 3, so that the electric wire W is located at a predetermined position.

In the position shown in FIG. 9, and when the motor 8C*b* of the feed means 8C is energized, the bellows tube installation device first advances or moves downwardly the bellows tube T along the tube guide 8E by means of driving force of the feed rollers 8C*a*, 8C*a*. Thus, the bellows tube T begins to be fitted over the tube guide 1 at the proximal end of the tube guide.

After the bellows tube T has been advanced predetermined amount or distance, a stop signal is output from the control unit 8D*c* of the length measurement means 8D to the drive circuit 8C*c* of the motor 8C*b*, and a drive signal is supplied to the air supply 8F*c* (see FIG. 8). The motor 8C*b* stops actuation of the feed rollers 8C*a*, 8C*a* in accordance with the above stop signal from the control unit 8D*c*. The air cylinder 8F*b* is actuated by the above drive signal from the control unit 8D*c*, so that the cutter 8F*a* intersects the bellows tube T so as to cut the bellows tube T.

Figure 11:
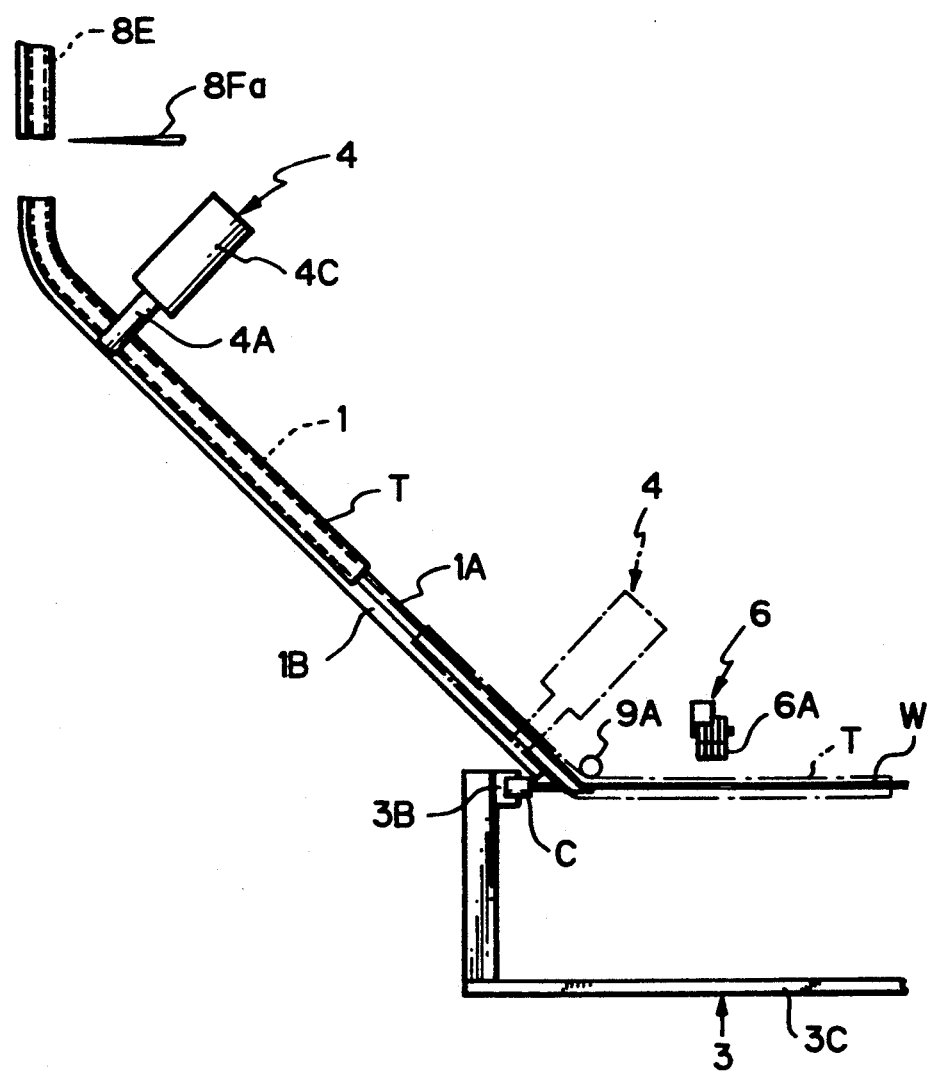
FIG. 11 is an illustrative view showing further stage of installation of the bellows tube.

When the bellows tube T has been cut by the cutter 8F*a* in the above manner, the air cylinder 2A of the guide displacement means 2 is actuated to as to extend to piston rod thereof, as illustrated in FIG. 11, so that the tube guide 1 fitted with the bellows tube T thereon is lowered to a position at which the electric wire W enters the notch 1*d* formed at the distal end of the tube guide 1.

When the tube guide 1 has been lowered, the drive part 4C of the first clamp means 4 is actuated, so that the clamp members 4A, 4B cooperate to hold therebetween the bellows tube T fitted over the tube guide 1, as shown by dotted line in FIG. 4. Simultaneously, the air cylinder 9B of the presser means 9 is actuated so that the presser rod 9A is located at a predetermined position on the electric wire W.

The rodless cylinder 5B of the first displacement means 5 is then actuated, so that the movable block 5B*b* of the rodless cylinder 5B is moved along the guide rod 5A*b*. This movement causes the first clamp means 4 attached to the movable block 5B*b*, together with the bellows tube clamped thereby, to be displaced distally or forwardly of the tube guide 1. When the bellows tube T has reached the distal end of the tube guide 1, the slit D of the bellows tube T is opened or enlarged at the distal end of the tube guide (see FIG. 3B). Further advancement of the bellows tube T causes the electric wire W to be inserted or housed within the bellows tube through the enlarged slit D, as shown by dotted line in FIG. 11.

During above period, upward embodiment of the bellows tube T adjacent to the distal end of the guide tube 1 is limited by means of the presser rod 9A. Accordingly, the bellows tube T is prevented from moving upwardly or escaping, even when the electric wire W engages with the circumferential edge around the slit of the bellows tube T.

Thus, the electric wire W is securely inserted into the bellows tube T which has been transferred from the distal end of the tube guide 1 to the fixed part of the electric wire W, as the electric wire W is moved distally. When the first clamp means 4 reaches lower limit position, the distal end of the bellows tube T has reached a position downstream of the lower part of the second clamp means 6.

When the first clamp means 4 has reached the lower limit position, the bellows tube T is released from the clamp members 4A, 4B of the first clamp means 4, and at the same time, the air cylinder 6C of the second clamp means 6 is actuated, so that the bellows tube T is clamped between the clamp members 6A, 6B.

Figure 12:
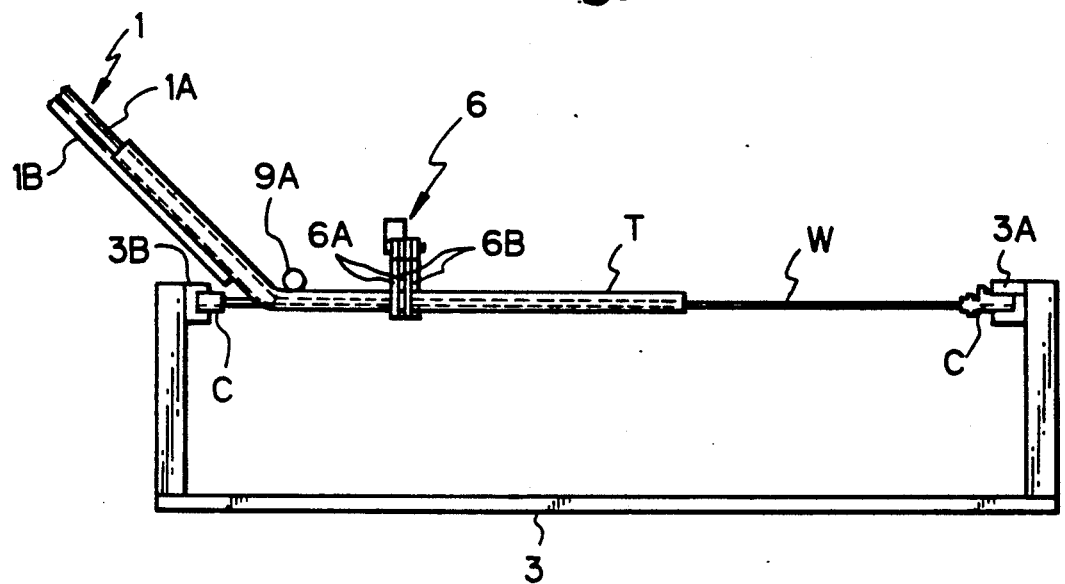
FIG. 12 is an illustrative view showing another stage of installation of the bellows tube.
Figure 13:
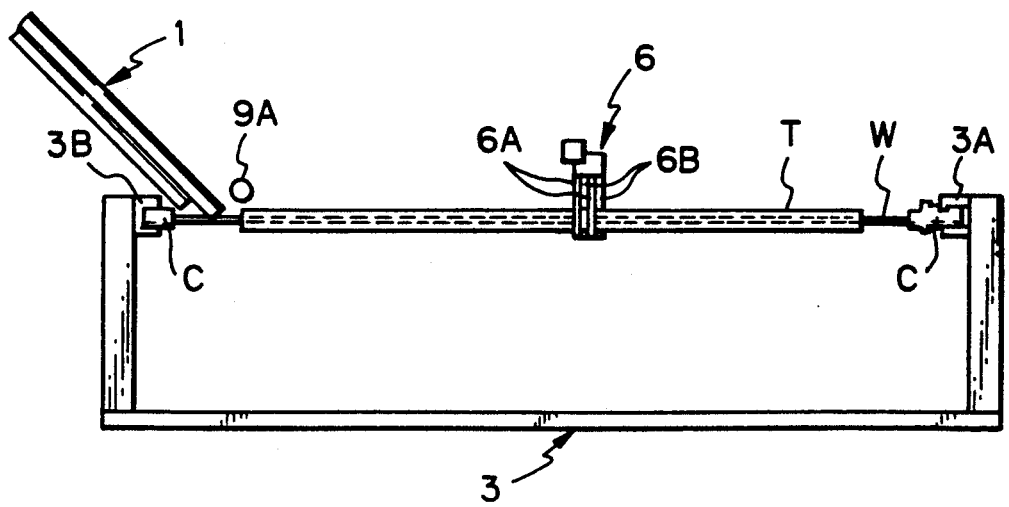
FIG. 13 is an illustrative view showing a further stage of installation of the bellows tube.

In the position shown in FIG. 12, the rodless cylinder 7B of the second displacement means 7 is actuated, so that the movable block 7B*b* of the rodless cylinder 7B is moved along the guide rod 7A*b*. This causes the second clamp means 6 attached to the movable block 7B*b*, together with the bellows tube T held by the second clamp means 6, to be moved toward the distal end of the electric wire W, as shown in FIG. 13. During the above period, the bellows tube T is also limited from upward movement at a position adjacent the distal end of the tube guide 1 by means of the presser rod 9A, so that the electric wire W is securely inserted into the bellows tube T which has been transferred from the distal end of the tube guide 1 to the fixed position of the electric wire W, as the electric wire W is moved distally.

As will be appreciated from the foregoing, the bellows tube installation device according to the invention permits the bellows tube T to be fitted over the electric wire W. The above-mentioned bellows tube installation device is designed so that a harness is manually located or positioned at the harness positioning part 3 after each installation of the bellows tube onto the electric wire of a harness has been completed. It will be appreciated, however, that an alternative harness positioning part may be employed in which a plurality of harnesses, arranged in parallel relationship, are provided in fixed manner, so that, as soon as a bellows tube T has been fitted over an electric wire W of a preceding harness, the next harness can be moved automatically to a position for installation of a bellows tube, so as to be replaced with the preceding harness. With such a harness positioning part, installation of bellows tubes T onto electric wires may be automatically and continuously performed in repeated manner by means of the bellows tube installation device of the invention.

It should be noted that the objective material which is fitted with a bellows tube by the bellows tube installation device of the invention need not necessarily be an electric wire as shown in the above embodiment. For example, such objective material can be filamentous body such as optical fibers. While in the above embodiment first and second displacement means having a rodless cylinder as a power or driving source, it should be noted that the first and second displacement means are not necessarily limited to such an illustrated embodiment, as long as they are able to suitably displace the first and second clamp means. Similarly, the first and second clamp means are not necessarily limited to the illustrated embodiment, as far as they are able to appropriately and securely hold the bellows tube during movement of the first and second displacement means.

In the illustrated embodiment, the tip or distal end of the tube guide is located at a position at which it intersects the electric wire or filamentous body. It should be also understood that the distal end of the tube guide and the filamentous body or wire are not necessarily intersected with each other, but positioned adjacent with each other, provided that the the opening of the slit of the bellows tube as enlarged by the distal end of the tube guide is maintained at sufficient openness sufficient to receive wire or filamentous body therein when the bellows tube intersects the filamentous body. The distal end of the tube guide is not necessarily configured as that shown in FIG. 3, as long as it has configuration by which the slit of the bellows tube fitted over the tube guide can be enlarged.

Figure 14:
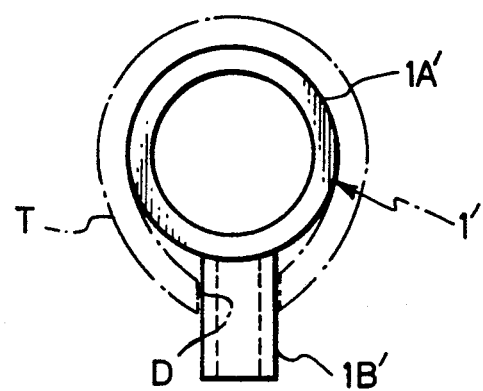
FIG. 14 is an illustrative view of an alternative embodiment of the tube guide.

For example, and as shown in FIG. 14, a tube guide 1' including a pipe 1A' having a constant diameter along its entire length and a guide protrusion 1B' formed integrally with the pipe 1A' and having an increased width at the distal end of the tube guide can also enlarge the slit D of the bellows tube T. In this embodiment, it is desirable that the guide protrusion 1B' is designed so as to engage a filamentous body, such as an electric wire located at a predetermined position.

In accordance with the present invention, it is possible to insert a filamentous body into a bellows tube through a slit formed in the bellows tube, the openness of the slit being automatically enlarged or increased by displacing the bellows tube along the tube guide. Accordingly, the present invention is advantageous in that operation of installing bellows tubes onto filamentous bodies may be performed in a short time with minimum operator's intervention, as well as achieving efficient productivity. Further, a filamentous body is accurately and securely inserted into the bellows tube which has been transferred form the distal end of the tube guide to the fixed part of the filamentous body, thereby minimizing occurrence of defective products. Furthermore, the bellows tube can be transferred to the fixed part of the filamentous body, without causing twisting thereof, with the slit thereof accurately opposed to the filamentous body.

The principles, preferred embodiments and modes of operation of the present invention have been described in the foregoing specification. The invention which is intended to be protected herein should, however, be construed as illustrative rather than restrictive. Variations and changes may be made by those skilled in the art without departing from the spirit of the present invention. Accordingly, the foregoing detailed description should be regarded as exemplary in nature and not as limiting the scope and spirit of the invention set forth in the appended Claims.

What is claimed is:

1. A bellows tube installation device comprising: a tube guide insertable into a bellows tube of a predetermined length, said bellows tube being formed with a slit extending longitudinally of said bellows tube, said tube guide having a distal end which is configured to enlarge said slit of said bellows tube placed over said tube guide, so that a filamentous body to be received within said bellows tube may pass through said enlarged slit, means for setting said filamentous body at a position in which said filamentous body is adjacent the distal end of said tube guide, a first clamp means for clampedly holding said bellows tube which is placed over said tube guide, said first clamp means being movable, together with said bellows tube clampedly held by said first clamp means, toward the distal end of said tube guide, a first displacement means for moving said first clamp means along said tube guide to a position in which one end portion of said filamentous body is partly inserted at least into the distal end portion of said bellows tube through said slit, a second clamp means for holding said bellows tube, at least said distal end portion of said bellows tube partly receiving said one end portion of said filamentous body, at a position where said filamentous body is inserted into said bellows tube, said second clamp means being movable, together with said bellows tube clamped by said second clamp means, along the longitudinal axis of said filamentous body toward the other end of said filamentous body, and a second displacement means for moving said second clamp means.

2. A bellows tube installation device according to claim 1, further comprising a presser means for pressing said bellows tube moving, together with said second clamp means, toward the other end of said filametous body at a position adjacent to said distal end portion of said tube guide and opposite to the side in which said slit is formed.

3. A bellows tube installation device according to claim 1 or claim 2, wherein said tube guide comprises a guide protrusion extending longitudinally of said tube guide and protruding outwardly from said slit of said bellows tube placed over said tube guide.

* * * * *